United States Patent
Chen

Patent Number: 6,141,442
Date of Patent: Oct. 31, 2000

[54] METHOD AND APPARATUS FOR CODING SEGMENTED REGIONS WHICH MAY BE TRANSPARENT IN VIDEO SEQUENCES FOR CONTENT-BASED SCALABILITY

[75] Inventor: Tsuhan Chen, Middletown, N.J.

[73] Assignee: AT&T Corp, New York, N.Y.

[21] Appl. No.: 09/358,594

[22] Filed: Jul. 21, 1999

Related U.S. Application Data

[63] Continuation of application No. 08/801,716, Feb. 14, 1997, Pat. No. 5,974,172.

[51] Int. Cl.[7] ............................................. G06K 9/00
[52] U.S. Cl. ................................. 382/166; 382/164
[58] Field of Search ........................... 382/162, 164, 382/165, 166, 282, 283; 348/390, 391, 26, 29, 577, 587, 592

[56] References Cited

U.S. PATENT DOCUMENTS

| | | | |
|---|---|---|---|
| 4,394,680 | 7/1983 | Watanabe | 348/587 |
| 5,117,283 | 5/1992 | Kroos et al. | 348/564 |
| 5,194,941 | 3/1993 | Grimaldi et al. | 348/587 |
| 5,659,490 | 8/1997 | Imamura | 364/526 |

Primary Examiner—Phuoc Tran

[57] ABSTRACT

A method and apparatus for generating region frames from video frames are disclosed which employs an industry standard encoder to lessen the negative impact on the quality of the transmitted video sequence while consuming fewer bits. The invention utilizes image segmentation and color replacement techniques to create the region frames. Each region frame includes a subject region, zero or more previously segmented regions and zero or more non-subject regions. The subject region is defined by the pixels of the original video frame. The previously segmented regions and non-subject regions are assigned replacement pixels $P_{n,y}$ and $C_n$, respectively. The replacement pixel $C_n$ is chosen to indicate a color that is not likely to be confused with any color in the subject region $R_n$. The replacement pixels $P_{n,y}$ are chosen such that the compression ratio of the region frame data is maximized. Using the region frames, content based scalability can be provided without the need for special encoders and/or channels having a wider bandwidth. The decoder may comprise color or chroma keying apparatus or circuitry keying on the replacement color $C_n$. Instead of keying on a single value, two thresholds may be assigned to define a boundary condition or a subject semi-transparent region. The decoder is forwarded data of the two thresholds and a flag is sent to indicate the dial boundary or semi-transparent region coding. A blending process blends the foreground and background of the semi-transparent object.

16 Claims, 14 Drawing Sheets

FIG. 2

| VIDEO SEQUENCE | COMPONENTS OF VIDEO SEQUENCE |
|---|---|
| $f_0$ | FRAME DATA: INFORMATION THAT DEFINES VIDEO FRAMES USING PIXEL VALUES |
| $f_1$ | SEGMENTATION DATA: INFORMATION THAT INDICATES THE REGION TO WHICH A PARTICULAR PIXEL OR PIXEL VALUE BELONGS |
| $f_2$ | REGION FRAME DATA: INFORMATION THAT DEFINES REGION FRAMES SEGMENTED FROM VIDEO FRAMES USING ORIGINAL PIXEL VALUES FOR THE SUBJECT REGION AND REPLACEMENT PIXEL VALUES $C_n$ AND $P_n$ FOR THE NON-SUBJECT REGION AND PREVIOUSLY SEGMENTED REGION, RESPECTIVELY |
| | REPLACEMENT PIXEL DATA: INFORMATION THAT INDICATES WHAT THE REPLACEMENT PIXELS $C_n$ AND $P_n$ ARE FOR THE REGION FRAMES |
| | REGIONAL GROUP DATA: INFORMATION THAT INDICATES WHICH REGION FRAMES ARE SEGMENTED FROM THE SAME VIDEO FRAME |
| $f_3$ | ENCODED REGION FRAME DATA: REGION FRAME DATA WHICH HAS BEEN PROCESSED BY AN ENCODER, i.e., REGION FRAME INFORMATION THAT HAS BEEN SELECTIVELY OMITTED, THEN COMPRESSED, AND THEN PARTIALLY TRUNCATED; INFORMATION THAT DEFINES A REGION FRAME USING TRANSFORMATION COEFFICIENTS AND MOTION VECTORS |
| | REPLACEMENT PIXEL DATA |
| | REGIONAL GROUP DATA |
| $f_4$ | DECODED REGION FRAME DATA: ENCODED REGION FRAME DATA WHICH HAS BEEN PROCESSED BY A DECODER |
| | REPLACEMENT PIXEL DATA |
| | REGIONAL GROUP DATA |
| $f_5$ | RECOVERED FRAME DATA: COMBINED DECODED REGION FRAME DATA |

200

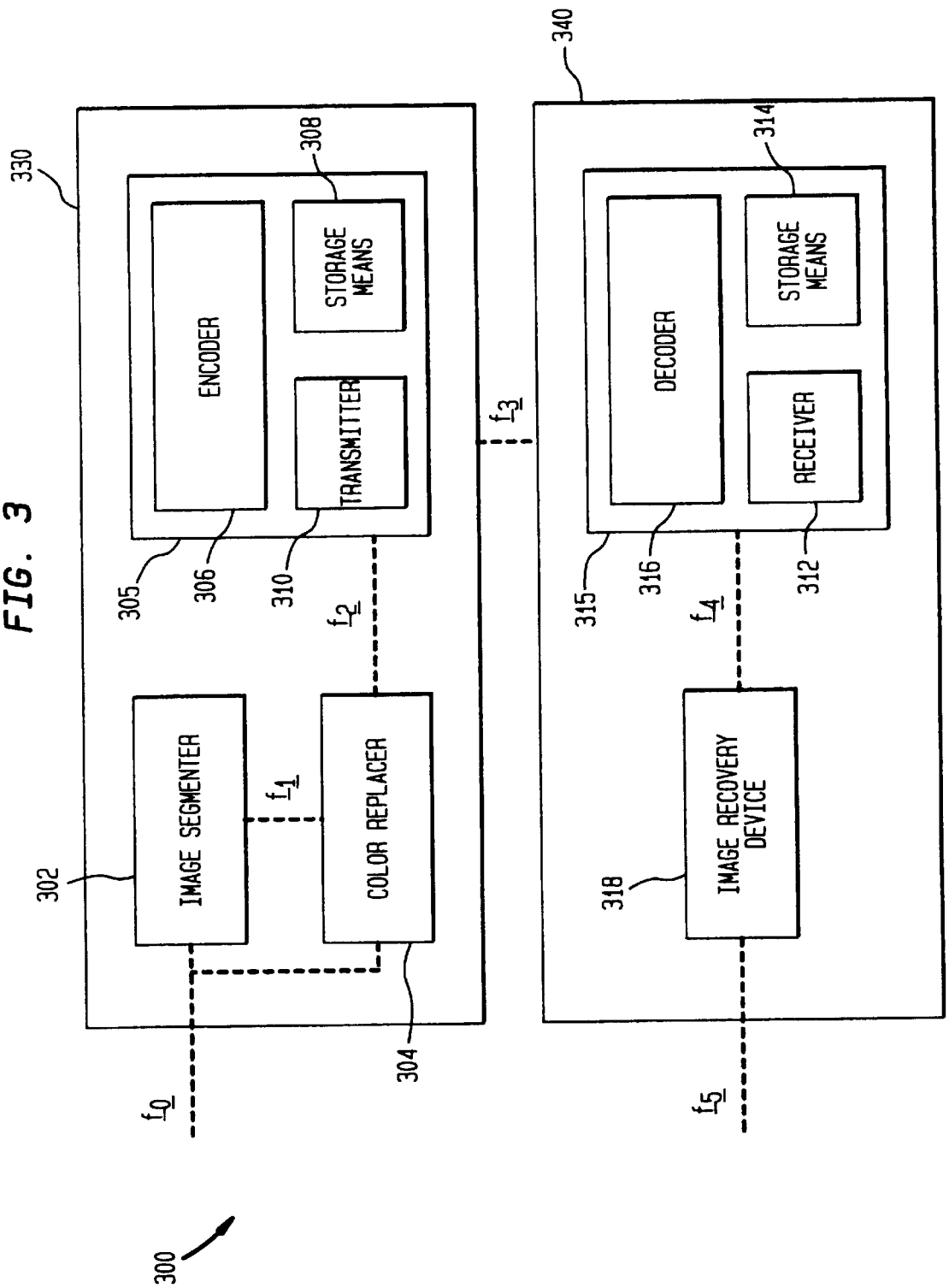

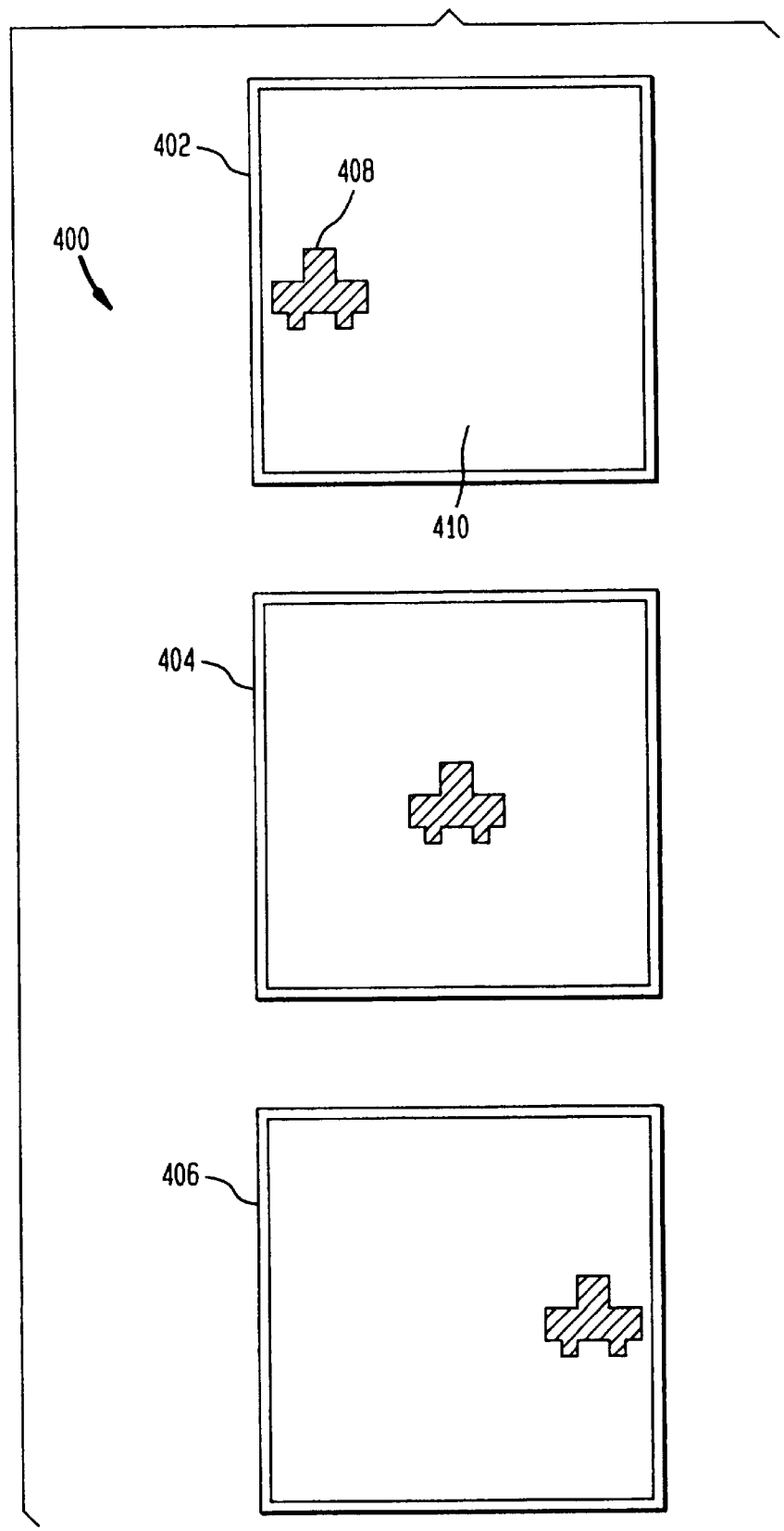

METHOD AND APPARATUS FOR CODING SEGMENTED REGIONS WHICH MAY BE TRANSPARENT IN VIDEO SEQUENCES FOR CONTENT-BASED SCALABILITY

CROSS-REFERENCE TO RELATED APPLICATION

This application is a continuation of U.S. patent application Ser. No. 08/801,716 filed Feb. 14, 1997, now U.S. Pat. No. 5,974,172.

BACKGROUND OF THE INVENTION

1. Field of the Invention

The present invention relates to the field of digital video technology and, more particularly, to a method and apparatus adapted to generate region frames and segment regions which may be semi-transparent or have a soft boundary from video for content-based scalability.

2. Background

Video sequences comprised of multiple video frames are processed by digital video coding systems prior to being transmitted as a bitstream over a channel of limited bandwidth. The bitstream includes video sequence data comprising pixel values that define the manner in which each video frame is generated onto a display. The bandwidth of the channel restricts the transmission rate of the bitstream (and video sequence date). A digital video coding system is employed to process the video sequence data in order to reduce the amount of bits or the amount of data included in the bitstream. Generally, however, the process employed by the digital video coding system, e.g., video sequence data reduction, has a negative impact on the quality of the transmitted video sequence.

Image segmentation techniques have been employed by some prior art systems to lessen the negative impact on the quality of selected regions and the transmitted video sequence. Image segmentation involves separating or distinguishing regions depicted in the video sequence in the form of segmentation data. Segmentation data includes data for indicating the region to which specific pixels in the video sequence belong. Prior art digital video coding systems utilize image segmentation techniques to reduce portions of the video sequence data according to specific regions. In other words, the quality of each region in the video sequence can be individually specified.

Referring to FIG. 1, there is shown a representation of a typical prior art digital video coding system. As shown, the digital video coding system determines the segmentation data for the regions depicted in a video sequence using an image segmenter 102. An encoder 104 encodes the video sequence along with the segmentation data provided by the image segmenter 102. The manner in which the video sequence data is to be encoded can be specified using the segmentation data such that selected regions have a higher degree of quality than other regions. Subsequently, the encoded video sequence data and segmentation data are transmitted to a decoder 106 proximate a display device, for example, where the encoded video sequence data and segmentation data are decoded and the video sequence data is recovered.

For some prior art systems, the price for improving the quality of selected regions in the video sequence is the transmission of additional bits. As shown in FIG. 1, the encoded segmentation data is included in the bitstream along with the encoded video sequence data because the encoded segmentation data is necessary to recover the video sequence. In other words, the segmentation data is normally needed to determine the manner in which the video sequence data was encoded such that the video sequence data can be re-created or recovered. In other prior art systems, the encoded segmentation data may not be necessary to recover the video sequence. However, these prior art systems do not provide content based scalability.

All prior art systems utilizing image segmentation techniques to improve the quality of selected regions in a video sequence require special encoders. Industry standard encoders are operative to encode the video sequence data using the well-known M.P.E.G., H.261 or H.263 (under development) compression algorithms which encode the video sequence data using some combination of discrete cosine transformation and motion compensation. The region to which a particular pixel belongs is irrelevant to these compression algorithms. The exemplary encoder 104 of the prior art system thus employs a different compression algorithm for encoding the video sequence according to region. This requires the encoder 104 to perform an extra process before the video sequence data can be encoded. Specifically, the encoder 104 must first determine which region each pixel value belongs to before the video sequence data can be encoded. These types of encoders have not been widely accepted by the industry. Accordingly, there exists a need for a digital video coding system that employs an industry standard encoder to lessen the negative impact on the quality of the transmitted video sequence while still transmitting fewer bits.

SUMMARY OF THE INVENTION

The present invention discloses a method and apparatus for generating region frames from video for content based scalability. Our invention was first described in U.S. Pat. No. 5,786,855, filed Oct. 25, 1995 entitled "Method and Apparatus for Coding Segmented Regions in Video Sequences for Content-based Scalability," incorporated herein as to its entire contents. In one preferred embodiment of the present invention, the method for generating region frame data from video frame data comprises: extracting pixel values defining a subject region from the video frame data into the region frame data; assigning a non-subject pixel value in the region frame data for defining non-subject regions; and assigning first and second thresholds, one representing the subject region and the other representing the non-subject regions.

The method of the present invention further comprises the step of recovering the video frame data from the region frame data using a non-subject pixel index. The non-subject pixel index denotes which non-subject pixel value has been assigned in the region frame data. Advantageously, unlike the prior art systems, the present invention does not require segmentation data to indicate the region to which a particular pixel value belongs in order to recover the frame data. Additionally, the region frame data is converted into encoded region frame data using industry standard encoders while still providing content based scalability.

In one preferred embodiment of the present invention, the apparatus for processing video frame data into region frame data comprises: a video coding means for segmenting the region frame data from the video frame data. The video coding means includes means for extracting pixel values from the video frame data defining a subject region; means for assigning a non-subject pixel value for defining non-subject regions, the non-subject pixel value indicative of a color not indicated by any of the pixel values defining the subject region; and means for assigning first and second thresholds, one representing the subject region and the other representing the non-subject regions.

The described invention further comprises a method for specially treating boundaries between a subject region and a non-subject or background region of a video frame. Boundaries or borders of subject regions may be provided with gray-level values to create soft boundaries. Soft boundaries have a variety of applications including computer graphics and camera enhanced graphics to provide smooth, alias-free and natural-looking boundaries, for example, when layers of images or graphics are combined together. Instead of using one threshold for defining whether an image is a subject region or a non-subject region, two thresholds can be used where a region between the thresholds is the boundary and the values of the thresholds define the boundary characteristics. For example, the soft decision may be exemplified by a simple ramp function (instead of a step function) between values of the two thresholds.

Furthermore, the solution for boundary softening may be enhanced to provide a solution to the presentation of transparent or semi-transparent images. The resulting value for a pixel will be a weighted combination of the pixel value in the current picture an the pixel value from the background picture.

These and other features of the present invention will be understood from reading the detailed description of the present invention which follows.

BRIEF DESCRIPTION OF THE DRAWINGS

For a better understanding of the present invention, reference may be had to the following description of exemplary embodiments thereof, considered in conjunction with the accompanying drawings, in which:

FIG. 2 illustrates a table that describes the transformation of a video sequence as the video sequence is processed by the present invention;

FIG. 3 illustrates a block diagram of a digital video coding system of the present invention;

FIG. 4 illustrates a video sequence $f_0$, for input into the digital coding system depicted in FIG. 3;

DETAILED DESCRIPTION

Figure 1:
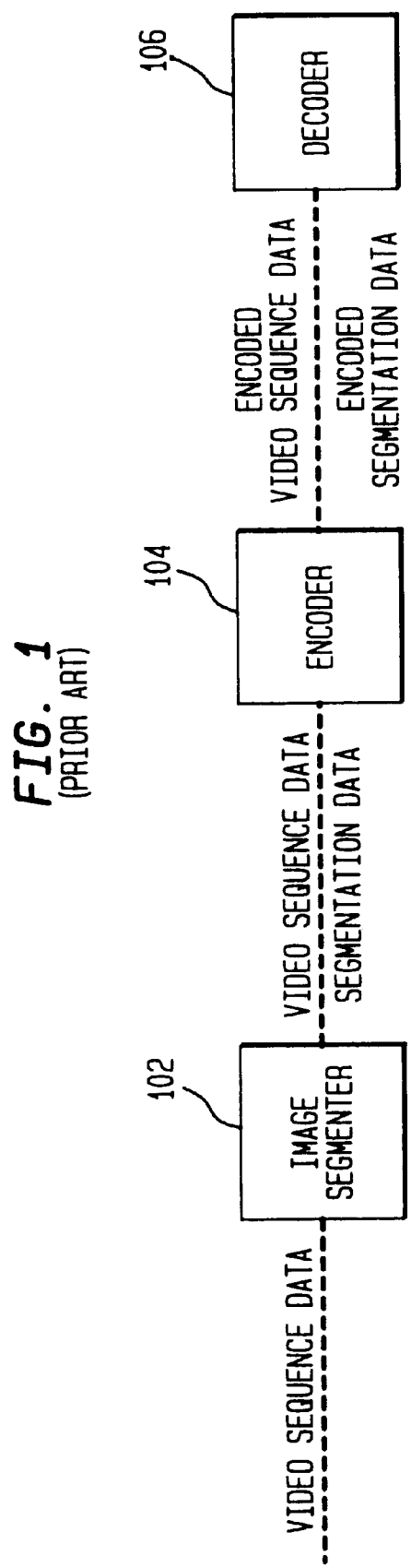
FIG. 1 illustrates a typical prior art system utilizing image segmentation techniques to encode segmented regions in a video frame.

The present invention discloses a method and apparatus for generating region frames from video frames for content based scalability. Referring to FIG. 3, there is shown a block diagram of one preferred embodiment of a digital video coding system 300 according to the present invention. The digital video coding system 300 comprises a video encoding system 330 and a video decoding system 340. The video encoding system 330 is a processing unit operative to generate and encode region frames. The video encoding system 330 includes an image segmenter 302, a color replacer 304 and a digital video compression means 305. The digital video compression means 305 further includes an encoder 306, a data storage means 308 and a transmitter 310. The video decoding system 340 is a processing unit operative to decode region frames encoded by the video encoding system 330 and to recover the frame data from the region frame data. The video decoding system 340 includes a digital video decompression means 315 and an image recovery device 318. The digital video decompression means 315 further includes a receiver 312, a data storage means 314 and a decoder 316.

Referring to FIG. 2, there is illustrated a table 200 that describes the components of the video sequences as the digital video coding system 300 depicted in FIG. 3 processs the video sequences. A video sequence $f_0$ comprising frame data enters the image segmenter 302. Preferably, the video sequence $f_0$ is in digital form otherwise an analog-to-digital converter, not shown, is used to convert the video sequence $f_0$ into digital form. The image segmenter 302 utilizes image segmentation to extract segmentation data corresponding to the video frames in the video sequence $f_0$. The output video sequence $f_1$ from the image segmenter 302 comprising the segmentation data enters the color replacer 304 along with the video sequence $f_0$. The color replacer 304 generates region frames from the video sequence $f_1$ and novel color replacement techniques of the present invention. In one embodiment of the present invention, the color replacer 304 generates one region frame for each region in each video frame. The output video sequence $f_2$ from the color replacer 304 comprising region frame data, a replacement pixel index and regional group data enters the digital video compression means 305 where the video sequence $f_2$ is encoded to reduce the amount of data needed to define the video sequence $f_2$. The output from the compression means 305 is video sequence $f_3$ comprising encoded region frame data, the replacement pixel index and the regional group data. The video sequence $f_3$ is transmitted over a channel of limited bandwidth to the video decoding system 340.

The video sequence $f_3$ transmitted from the video encoding system 330 is received by the digital video compression means 315 where the encoded region frame data in the video sequence $f_3$ is decoded. The output from the digital video compression means 315 is the video sequence $f_4$ comprising decoded region frame data, the replacement pixel index and the regional group data. The video sequence $f_4$ is then processed by the image recovery device 318 which is operative to combine the decoded region frame data using the replacement pixel index and the regional group data such that the frame data is recovered. The output video sequence $f_5$ comprising the recovered frame data can be subsequently generated onto a display, not shown. Definitions and detailed descriptions of the video encoding system 330 and the video decoding system 340 are provided herein.

VIDEO SEQUENCES

Referring to FIG. 4, there is illustrated a video sequence $f_0$ 400, such as a full-motion video. The video sequence $f_0$ comprises a series of images or video frames 402, 404 and 406 having regions $R_n$, where n=1, ..., N denotes a region in the video frame. A region is an object or group of objects depicted in the video frame. To generate the video frame on a display, such as a video monitor, the display must be provided with information that defines the video frames (referred to herein as "frame data"). Specifically, the frame data must assign a color or intensity to each pixel in the display. A pixel is the smallest element of the display which can be assigned a color or intensity. Each pixel has associated a pixel value that determines the color or intensity of the particular pixel. These pixel values constitute the frame data that defines the video frames. Note that an eight-by-eight (or sixteen-by-sixteen) block of pixels is referred to herein as a macroblock. A macroblock is defined by an eight-by-eight (or sixteen-by-sixteen) array of pixel values. Accordingly, frame data can define a video frame using macroblock arrays.

Figure 5:
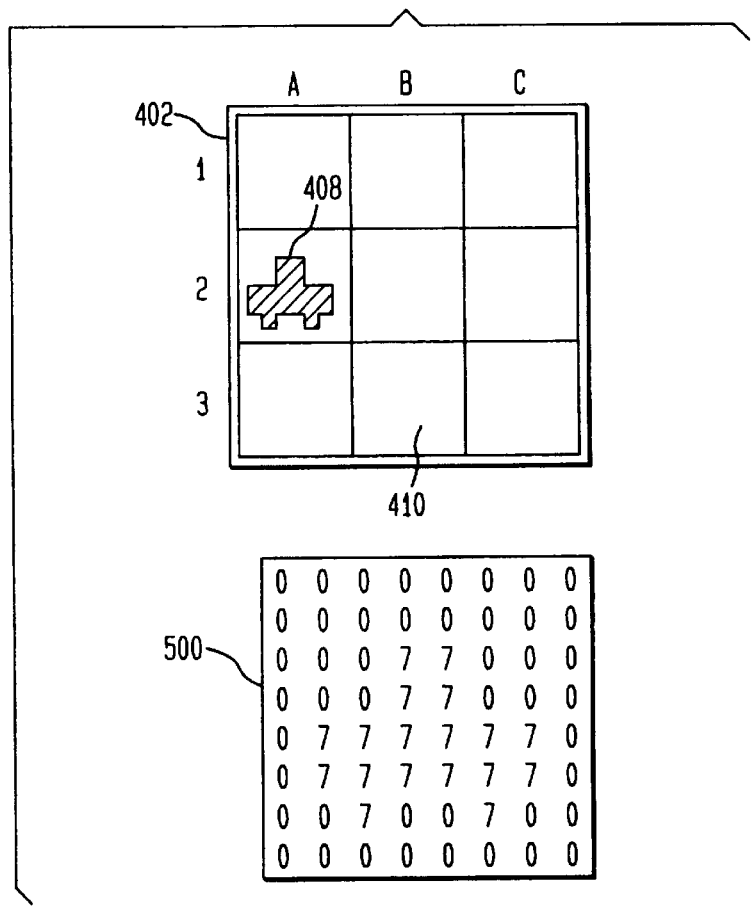
FIG. 5 illustrates a video frame 402 as being composed of macroblocks.
Figure 6:
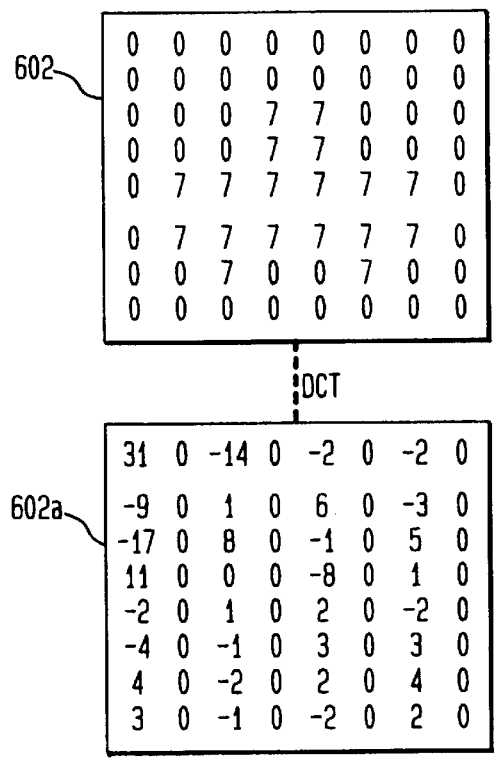
FIG. 6 illustrates pixel values for the macroblock A2 in the video frame 402 depicted in FIG. 5.

Referring to FIG. 5, there is illustrated an exemplary video frame 402 comprising a region 408, i.e., a black car, and a region 410, i.e., a white background, divided into a group of macroblocks. For ease of discussion, specific macroblocks are hereinafter identified by their corresponding column and row labels. A macroblock array 500 defines the macroblock A2 in the video frame 402. The pixel values "0" and "7" in the macroblock array 500 are indicative of the colors black and white, respectively.

ENCODING GENERALLY

The transmitter 310 of the present invention is operative to transmit the frame data for the video sequence $f_0$ as a bitstream over a channel of limited bandwidth to the receiver 312. The limited bandwidth of the channel, however, imposes a restriction on the rate the frame data for the video sequence $f_0$ is transmitted to the receiver 312 and subsequently generated onto a display. Referring back to FIG. 4, for example, suppose the video frames 402, 404 and 406 depict the position of the black car every one-quarter of a second, and the frame data for each of the video frames in the video sequence $f_0$ requires eighty bits in the bitstream. If the channel in which the frame data is transmitted has a bandwidth of eight bits per second, for example, then one second is required to transmit the complete frame data for each of these video frames 402, 404 and 406. Thus, if the video decoding system 340 was generating the video sequence $f_0$ on a display as the frame data arrive at the receiver 312, the video frames 402, 404 and 406 would be generated one-second apart instead of one-quarter of a second apart. In other words, an additional three-quarters of a second is interposed between the video frames 402, 404 and 406 causing the video sequence $f_0$ to appear four times slower when generated on the display.

To increase the transmission rate of the frame data for a video sequence to the receiver 312, a channel with a wider bandwidth can be used. This solution, however, is costly. A less expensive alternative involves employing the encoder 306 which is a processing means operative to selectively reduce the amount of frame data being transmitted. The preferred embodiment of the present invention employs an encoder 306 that processes and reduces frame data for a video sequence while maintaining a high degree of quality for the video sequence. Note that herein the term "quality" of the video sequence applies to the resolution, signal to noise ratio and/or frame rate of the video sequence.

Specifically, the encoder 306 of the preferred embodiment of the present invention selectively omits the frame data for predetermined video frames in the video sequence, compresses the remaining frame data and/or truncates portions of the compressed frame data.

FRAME DATA OMISSION

The first step the encoder 306 of the preferred embodiment of the present invention employs to reduce the amount of frame data is selective omission of frame data. Referring back to the previous example in FIG. 4, suppose the encoder 306 selectively transmits the frame data for every other video frame in the video sequence $f_0$, i.e., the video frame 404 is omitted. In other words, the video sequence $f_0$ is modified by the encoder 306 to include only the video frames 402 and 406, which depict the position of the black car one-half of a second apart. Since the frame data for both of these video frames consume eighty bits each, they would still arrive at the receiver 312 one-second apart but the additional time interposed between the two video frames has been reduced from three-quarters of a second to one-half of a second. Thus, the modified video sequence $f_0$ would appear two times slower when generated on the display.

COMPRESSION

The second step the encoder 306 of the preferred embodiment of the present invention employs to reduce the amount of frame data is compression. Compression involves encoding the frame data for the video frames such that less information is required to define the same video frames. Suppose, for example, the frame data for the video frame 402 and 406 were compressed fit percent by the encoder 306, thus making the frame data for those video frames forty bits each. The frame data for the video frame 406 can now be completely transmitted one-half of a second after the complete transmission of the frame data for the video frame 402. Thus, no additional time is interposed between the video frames 402 and 406 and the modified video sequence $f_0$ can be subsequently generated on the display without any undesirable time delay interposed between the video frames.

A compression algorithm, such as the well-known MPEG, H.261 or H.263 compression algorithm, is employed by the encoder 306 in one embodiment of the present invention to convert the frame data into a compressed form of the frame data (also referred to herein as "compressed frame data"). The typical compression algorithm converts the macroblock arrays into transformed macroblock arrays, transformed difference arrays and motion vectors that define the same video frame. Transformed macroblock arrays are arrays of transformation coefficients representing the frequency components of the pixel values in the original macroblock array. Transformed difference arrays are arrays that indicate the difference between the transformation coefficients of two transformed macroblock arrays. Motion vectors are vectors indicative of a change in relative position between a macroblock in one video frame and a second macroblock in a second video frame. Accordingly, compressed frame data can be described as frame data that defines a video frame using transformation coefficients and motion vectors instead of pixel values. A brief description of the well-known MPEG compression algorithm is provided in U.S. Pat. No. 5,786,855, filed Oct. 25, 1995, incorporated herein by reference, the discussion being omitted here as incidental to an understanding of the present invention.

To improve the quality of selected regions in the video frames undergoing the encoding process, the present invention provides a method and apparatus for generating region frames from video frames. Region frames of the present invention provide for content based scalability while using industry standard encoders and fewer bits than the prior art. The term content based scalability refers to the ability to segment video frames and to vary the quality for each region segmented from the video frame. The region frames of the present invention are generated from the video frames using the image segmenter 302 and the color replacer 304.

IMAGE SEGMENTING

Figure 7:
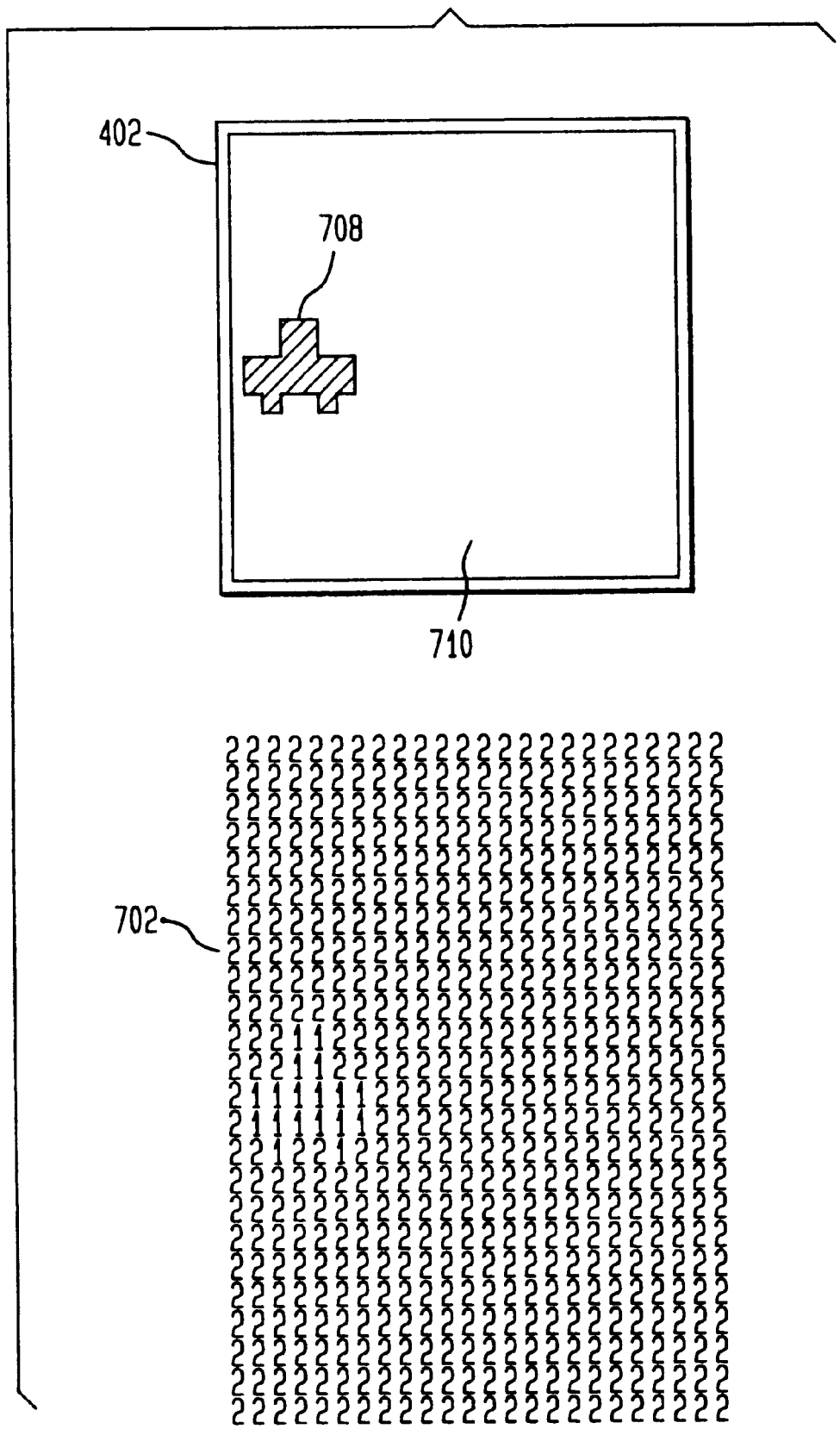
FIG. 7 illustrates a map frame corresponding to the video frame 402 depict in FIG. 4.

Referring back to FIG. 3, the video sequence $f_0$ is received by the image segmenter 302 of the video encoding system 330 in digital form. The image segmenter 302 of the preferred embodiment of the present invention utilizes any of the well-known image segmentation techniques to produce segmentation data. Some examples of image segmentation techniques include: (1) measurement space guided spatial clustering; (2) single linkage region growing schemes; (3) hybrid linkage region growing schemes; (4) centroid linkage region growing schemes; (5) spatial clustering schemes; and (6) split-and-merge schemes, all of which are well-known in the art. One embodiment of the present invention provides segmentation data in the form of maps. A map is an array of values indicative of the region to which a particular pixel belongs. The image segmenter 302 replaces the pixel values that consititute the frame data for video frames with values indicative of the region to which they belong. Referring to FIG. 7, there is illustrated a map 702 corresponding to the video frame 402. The map 702 comprises the values "1" and "2" to indicate the regions 708 and 710, respectively, to which the corresponding pixels belong. Using the map 702, the boundaries for the regions 708 and 710 can be extracted. For example, the region 708 is the area of the map labeled with the value "1". The boundary for the region 708 is defined by the values "1" that are adjacent, i.e., immediate left, right, top or bottom, to values other than "1". The output video sequence $f_1$ from the image segmenter 302 comprises segmentation data in the form of maps.

COLOR REPLACING

The video sequences $f_0$ and $f_1$, are provided as input into the color replacer 304. The color replacer 304 of the preferred embodiment of the present invention is operative to segment the video frames in the video sequence $f_0$ into region frames $RF_n$ using the corresponding maps in the video sequence $f_1$. Recall that n=1, . . . N denotes a region in the video frame. A region frame is a video frame where the pixels for all but one region in the image are replaced with a pixel (or pixels) of a chosen color (or colors). Frame data that defines the region frames $RF_n$ (hereinafter referred to as "region frame data") comprises original pixel values and replacement pixel values.

The regions in the region frame $RF_n$ are categorized as one of three types: (1) subject region $R_n$ (2) previously segmented region $R_y$ and (3) non-subject region $R_x$, where $0<y<n$ and $n<x<N$. Each region frame $RF_n$ includes one subject region $R_n$, n−1 previously segmented regions $R_y$ and N-n non-subject regions $R_x$. The subject region $R_n$ is defined in the region frame data $RF_n$ with the portion of the frame data that represents the subject region $R_n$ being segmented from the video frame. The previously segmented regions $R_y$ are defined in the region frame data $RF_n$ with replacement pixel values $P_{n,y}$, where $P_{n,y}$ is indicative of one or more colors for each previously segmented region $R_y$. The non-subject regions $R_x$ are defined in the region frame data $RF_n$ with a replacement pixel value $C_n$, where $C_n$ is indicative of a color not likely to be mistaken with any color in the subject region $R_n$. The manner in which the replacement pixel values $P_{n,y}$ and $C_n$ are chosen will be explained herein.

Figure 8:
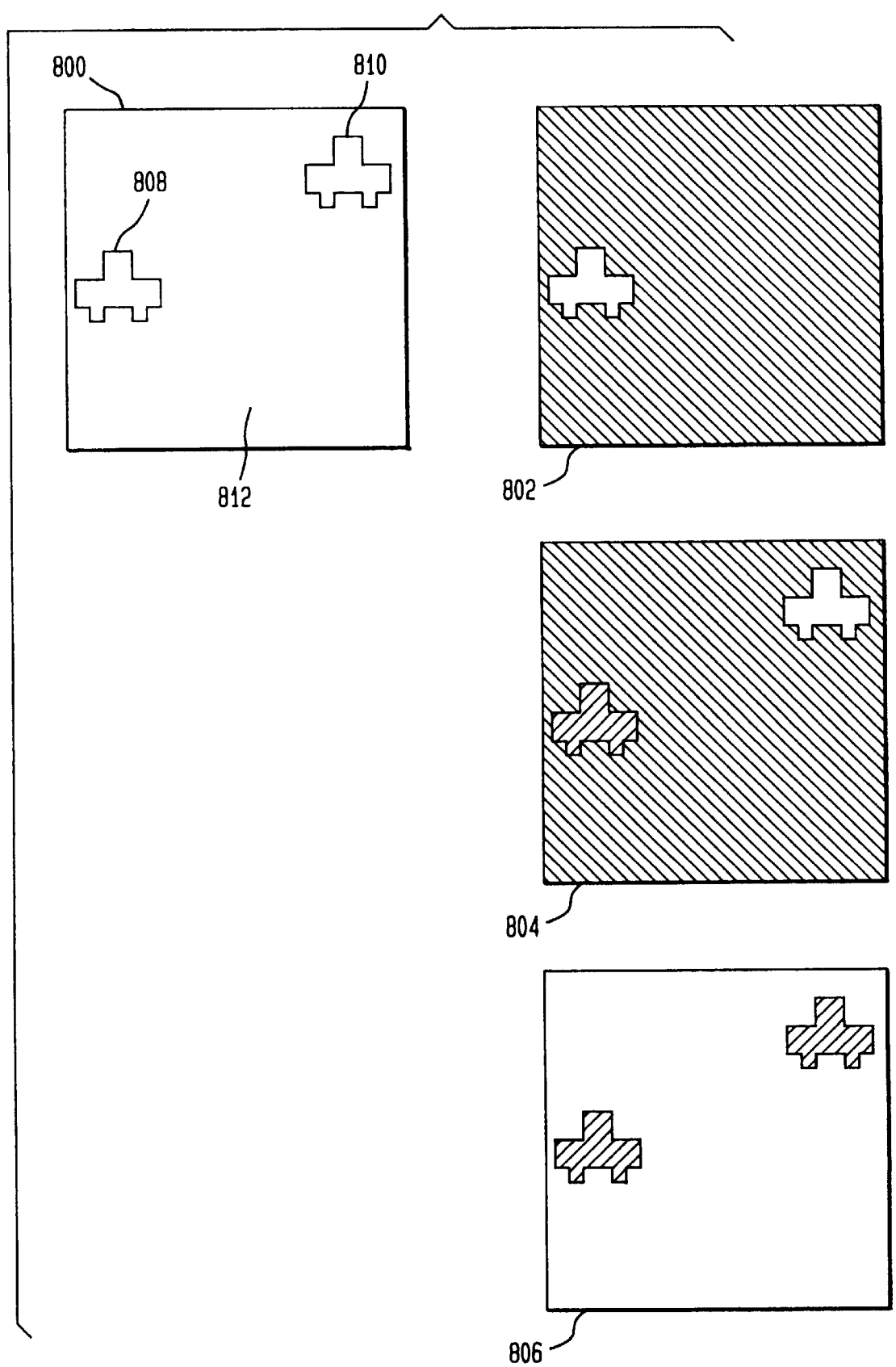
FIG. 8 illustrates the manner in which region frames are segmented from video frames.

Referring to FIG. 8, there is provided an illustration of the manner in which region frames $RF_1$ 808, $RF_2$ 810 and $RF_3$ 812 are segmented from the video frame 800. The first region frame segmented is the region frame $RF_1$ 802 which is defined by the original pixel values for the subject region $R_1$ 808 and a replacement pixel value $C_1$ for the non-subject regions $R_2$ 810 and $R_3$ 812. Referring to FIG. 3, the color replacer 304 references the corresponding map for the video frame 800 to determine whether a particular pixel value in the frame data belongs to the subject region $R_1$ 808 or the non-subject regions $R_2$ 810 and $R_3$ 812. All of the pixel values that belong to the subject region $R_1$ 808 will be extracted from the frame data for video frame and included in the region frame data $RF_1$. All of the pixel values that belong to the non-subject regions $R_2$ 810 and $R_3$ 812 will be assigned the replacement pixel value $C_1$ in the region frame data $RF_1$, where $C_1$ indicates a color that is not likely to be mistaken for any color in the subject region $R_1$ 808. Advantageously, by assigning one color to the non-subject regions, compression of the portion of the region frame data that represents the non-subject regions is maximized since the non-subject regions are "flattened", as explained earlier herein.

SELECTING PIXELS FOR NON-SUBJECT REGIONS

Figure 9:
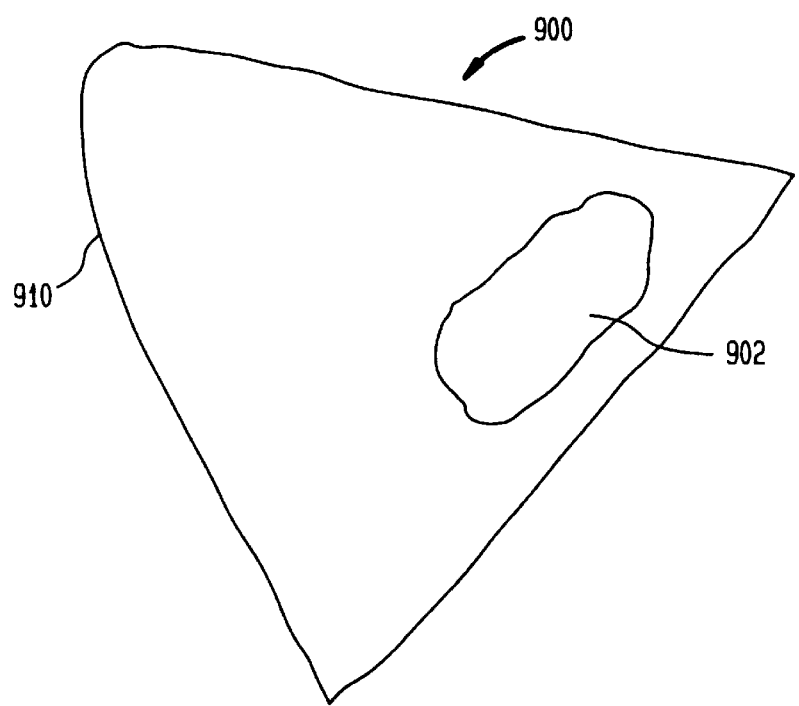
FIG. 9 illustrates a representation of a color space.
Figure 10:
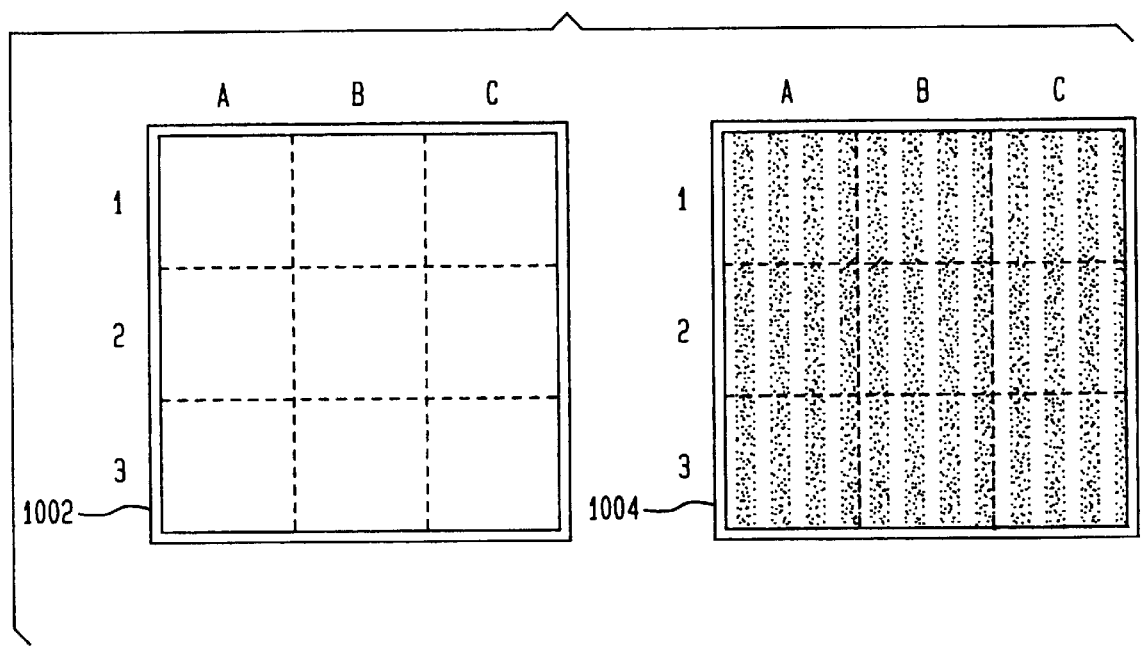
FIG. 10 illustrates video frames depicting a white wall and a striped wall-papered wall.
Figure 11:
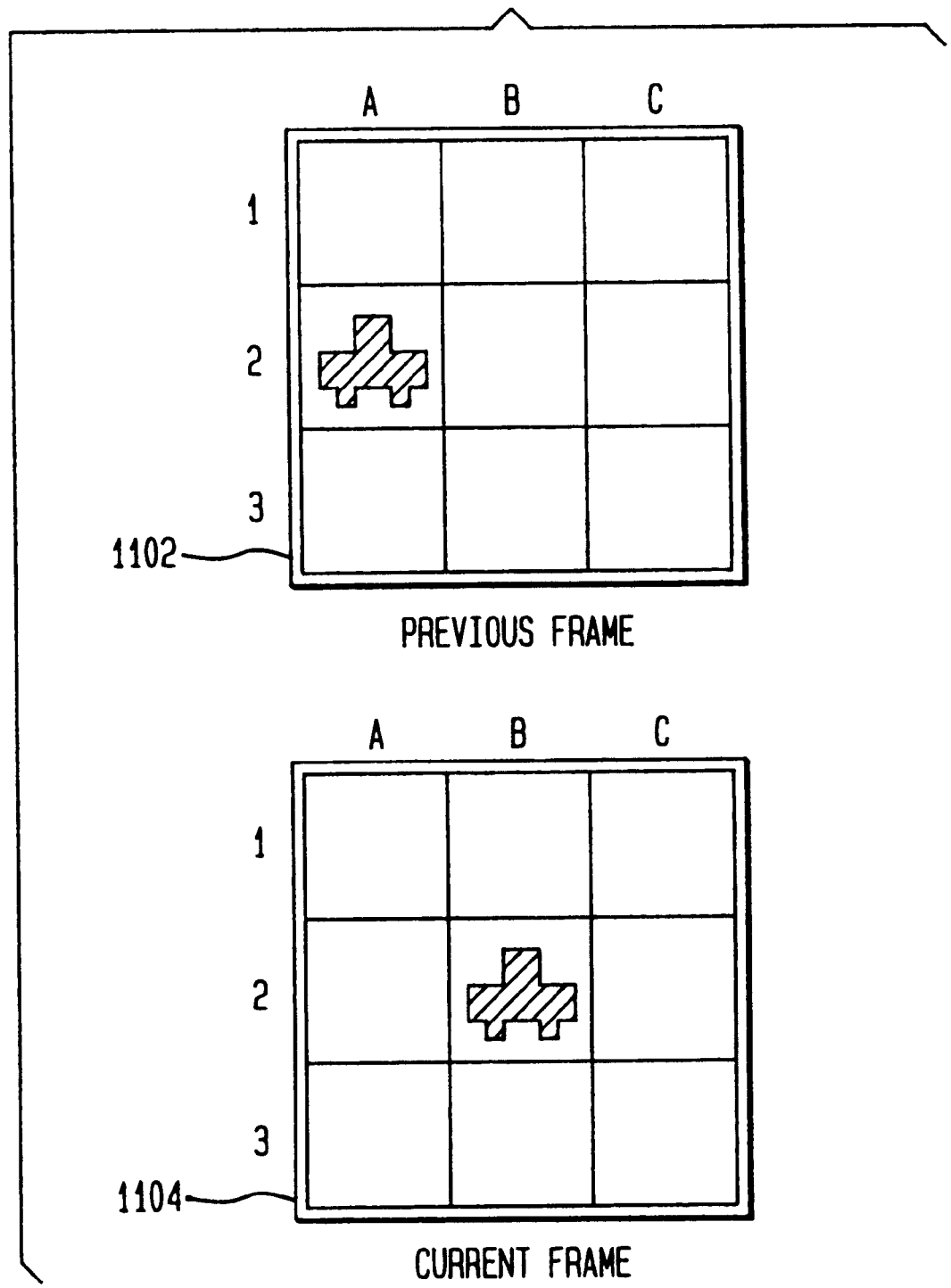
FIG. 11 illustrates a current video frame and a previous video frame.

One embodiment of the present invention determines the replacement pixel value $C_1$ by performing an exhaustive search of an entire color space, e.g., RGB or YUV, for a color that is of the maximum distance from all the colors in the subject region $R_1$. A representation of a color space 900 is shown in FIG. 9. A block 902 is representative of all the colors in the subject region $R_1$ 808 and the point 910 is a maximum distance from the block 902 in the color space 900. Thus, the point 910 is chosen as the color indicated by the replacement pixel value $C_1$.

Another method for choosing a replacement pixel value $C_1$ includes selecting a color in the color space 900 that is at least a predetermined minimum distance from all the colors in the subject region $R_1$ defined by the block 902.

Referring again to FIG. 8, the second region frame segmented is the region frame $RF_2$ 804, which is defined by the original pixel values for the subject region $R_2$ 810, a replacement pixel value $C_2$ for the non-subject region $R_2$ 812 and a replacement pixel value $P_{2,1}$ for the previously segmented region $R_1$ 808. The color replacer 304 references the corresponding map for the video frame 800 to determine whether a particular pixel value in the frame data belongs to the subject region $R_2$ 810, non-subject region $R_3$ 812 or previously segmented region $R_1$ 808. All of the pixel values that belong to the subject region $R_2$ 810 will be extracted from the frame data for video frame 800 and included in the region frame data $RF_2$. All of the pixel values that belong to the non-subject region $R_3$ 804 will be assigned the replacement pixel value $C_2$ in the region frame data $RF_2$. The replacement pixel value $C_2$ for the non-subject region $R_3$ 812 is determined in the same manner described above for the replacement pixel value $C_1$. All of the pixel values that belong to the previously segmented region $R_1$ 808 will be assigned the replacement pixel value $P_{2,1}$ in the region frame data $RF_2$. Unlike the replacement pixel value $C_2$, the replacement pixel value $P_{2,1}$ can indicate any color or intensity.

SELECTING PIXELS FOR PREVIOUSLY SEGMENTED REGIONS

The preferred embodiment of the present invention selects a replacement pixel value $P_{n,y}$ for the previously segmented region $R_y$ such that the compression ratio of the region frame $RF_n$ is maximized. Compression ratio is defined herein as the ratio of the number of bits consumed by the original region frame data to the number of bits consumed by the compressed region frame data. Specifically, the present invention utilizes the freedom to assign any color or colors to previously segmented regions $R_y$ such that the region frame $RF_n$ can be defined with the minimum amount of data. The manner in which the present invention chooses replacement pixels $P_{n,y}$ for region frames $RF_n$ depends on the positions of the subject region $R_n$ and the previously segmented regions $R_y$ in the region frame $RF_n$. Examples illustrating the manner in which the replacement pixel $P_{n,y}$ are chosen are provided below. However, this should not be construed to limit the present invention to only the methods disclosed in these examples.

When the previously segmented regions $R_y$ are not touching the subject region $R_n$, then the replacement pixels $P_{n,y}$ will be chosen such that the replacement pixels $P_{n,y}$ are not likely to be confused with any color in the subject region $R_n$. In other words, the replacement pixels $P_{n,y}$ will be chosen in the same manner as $C_n$ or will be identical to $C_n$, if there is a $C_n$. For example, referring back to FIG. 8, the replacement pixel value $P_{2,1}$ for the previously segmented region $R_1$ 808 in the region frame $RF_2$ 804 should be the same as the replacement pixel value $C_2$ to flatten the region frame $RF_2$ and maximize the compression ratio.

Figure 13:
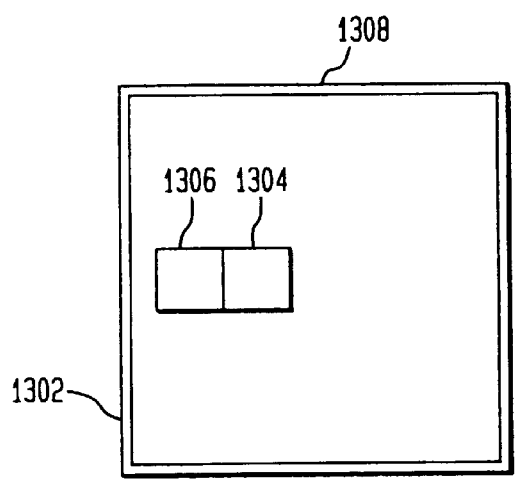
FIG. 13 illustrates a region from $RF_2$ having a subject region $R_2$, a previously segmented region $R_1$, and a non-subject region $R_3$.

When a previously segmented region $R_y$ is touching or partially covered by the subject region $R_n$ and a non-subject region $R_x$, then the replacement pixel $P_{n,y}$ for that particular previously segmented region $R_y$ will be chosen such that there is a smooth color transition between the subject region $R_n$ and the particular non-subject region $R_x$. Referring to FIG. 13, there is illustrated a region frame $RF_2$ 1302 having a subject region $R_2$ 1306, a previously segmented region $R_1$ 1304 and a non-subject region $R_3$ 1308. Suppose the subject region $R_2$ 1306 is green and the non-subject region $R_3$ 1308 is red. For the portion of the previously segmented region $R_1$ 1304 that is touching (or partially covered by) the subject region $R_2$ 1306, the replacement pixel $P_{2,1}$ is green. For the portion of the previously segmented region $R_1$ 1304 that is touching (or partially covered by) the non-subject region $R_3$ 1308, the replacement pixel $P_{2,1}$ is red. The remaining portion of the previously segmented region $R_1$ 1304 has a replacement pixel $P_{2,1}$ that slowly changes from green to red such that there is a smooth color transition from the green subject region $R_2$ 1306 to the red non-subject region $R_3$ 1308. The smooth color transition flattens the region frame $RF_2$ 1302 as much as reasonably possible thereby maximizing the compression ratio of the region frame $RF_2$. Note that if the region frame $RF_n$ does not have a non-subject region $R_3$, then the replacement pixels $P_{n,y}$ will be the same color or colors as the boundary of the subject region $R_n$.

Figure 14:
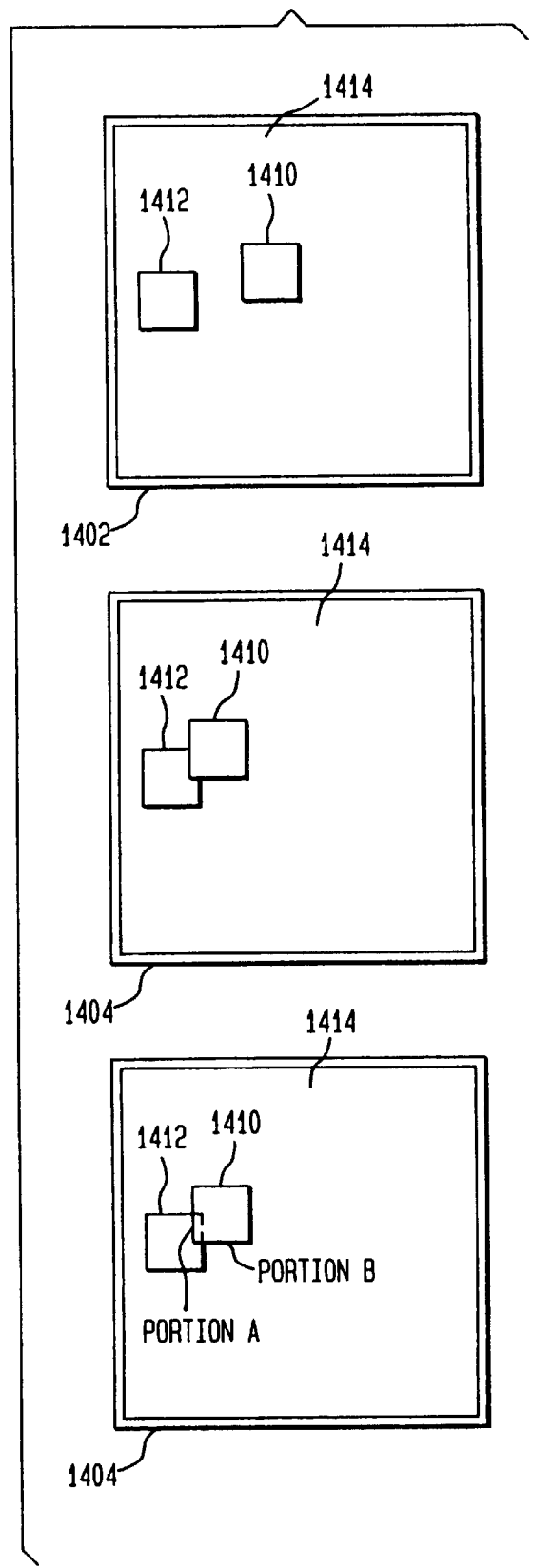
FIG. 14 depicts a previous video frame, a current video frame having three regions, and a region frame $RF_2$.

If a previously segmented region $R_y$ is partially covering the subject region $R_n$, the replacement pixel $P_{n,y}$ chosen will depend on the position of the subject region $R_n$ and that particular previously segmented region $R_y$ (which is partially covering the subject region $R_n$) in a previous video frame. Referring to FIG. 14, there is illustrated a previous video frame 1402 and a current video frame 1404 having regions 1410, 1412 and 1414. As depicted in the previous video frame 1402, regions 1410 and 1412 are separated from each other. In the current video frame 1404, the region 1412 is now partially covered by the region 1410. Region frame $RF_2$ 1406 is segmented from the current video frame 1404 and comprises a subject region $R_2$ 1412, a previously segmented region $R_1$ 1410 and a non-subject region $R_3$ 1414. In this situation, motion compensation will be employed to choose the replacement pixel $P_{2,1}$ that lies in portion A of the previously segmented region $R_1$ 1410. Specifically, the replacement pixel values $P_{2,1}$ in portion A will be identical to the corresponding pixel values in portion A of the previous video frame, i.e., the subject region $R_2$ 1412 is made to look whole, such that only a motion vector is required to define the portion A, thereby maximizing the compression ratio. The replacement pixel $P_{2,1}$ for the remaining portion B of the previously segmented region $R_1$ will be chosen in the same manner as described above when the subject region $R_2$ 1412 is touching or partially covering a previously segmented regions $R_1$ 1410.

The third and last region frame segmented from the video frame 800 in FIG. 8 is the region frame $RF_3$ 806 which is defined by the original pixel values for the subject region $R_3$ 812 and replacement pixel values $P_{3,1}$ and $P_{3,2}$ for the previously segmented regions $R_1$ 808 and $R_2$ 810, respectively. The region frame data $RF_3$ is gathered in the same above-described manner.

Note that the above-described color replacement techniques advantageously eliminate the need to include the corresponding maps in the output video sequence $f_2$ for purposes of recovering the segmented video frame, as required by the prior art. The region frame data $RF_n$ of the present invention inherently includes data defining the region boundary for the subject region $R_n$ in the region frame data $RF_n$, i.e., non-replacement pixel values $C_1$ that are adjacent to the replacement pixel values $C_1$ in the region frame data $RF_1$ constitute the region boundary for the subject region $R_1$ in the region frame $RF_1$.

ENCODING REGION FRAMES

The output video sequence $f_2$ from the color replacer 304 comprises region frame data $RF_n$, a replacement pixel index and a regional group data. The replacement pixel index indicates which pixel values are the replacement pixel values $C_n$ for each region frame $RF_n$. The regional group data indicates which region frames are segmented from the same video frame. The video sequence $f_2$ passes through the encoder 306 where the video sequence $f_2$ is processed into the output video sequence $f_3$. Specifically, as explained earlier, the encoder 306 of the preferred embodiment of the present invention omits frame data for region frames segmented from video frames in the video sequence $f_2$, compresses the remaining region frame data and/or truncates portions of the compressed region frame data The output video sequence $f_3$ comprises truncated compressed region frame data for the non-omitted region frames (hereinafter referred to as "encoded region frame data"), the replacement pixel index and the regional group data.

The size of the portions truncated from each compress region frame data $RF_n$ depends on the subject region $R_n$. For example, referring back to FIG. 8, suppose the details of the region 808 are deemed more important to viewers than the other regions 810 and 812. In such a situation, a lesser portion of the compressed region frame data for the region frames having the selected region as the subject region, i.e., region frame 802, is truncated. In effect, more bits are allocated for consumption by the selected region frame, e.g., the compressed region frame data for the selected region frame 802 consumes 20 bits more than the compressed region frame data for the non-selected region frames 804 and 806. This technique ensures that a high degree of quality for the selected region 808 is maintained as much as reasonably possible given the limited bandwidth of the transmitting channel and the needs of the non-selected regions.

DECODING

The transmitter 310 subsequently transmits the video sequence $f_3$ to the receiver 312 where the video sequence $f_3$ is decompressed by the decoder 316. The decoder 316 of the preferred embodiment of the present invention is operative to decompress the encoded region frame data that defines the transmitted region frames and output the video sequence $f_4$. The decompressed encoded region frame data is hereinafter referred to as "decoded region frame data." The output video sequence $f_4$ comprises the decoded region frame data that defines the transmitted region frames, the replacement pixel index and the regional group data. The decoded region frame data comprises macroblock arrays converted from the encoded region frame data. Note that the decoded region frame data in the video sequence $f_4$ is not identical to the corresponding region frame data in the video sequence $f_2$ due to the encoding process. Thus, video frames generated from the decoded region frame data typically will not be identical to video frames generated from the region frame data in the video sequence $f_0$.

IMAGE RECOVERY

The image recovery device 318 receives the video sequence $f_4$ and combines the decoded region frame data using the replacement pixel index and the regional group data. The output from the image recovery device 318 is frame data for a video sequence $f_5$, which is a modified version of the video sequence $f_0$. The frame data in the video sequence $f_5$ is hereinafter referred to as "recovered frame data." Recovered frame data comprises the combined extraction of pixel values from the decoded region frame data that belong to the subject regions $R_n$ of each region frame $RF_n$ segmented from the same video frame.

The preferred embodiment of the present invention utilizes an image recovery device 318 that extracts the pixel values of the subject regions $R_n$ from the decoded region frame data $RF_n$. Specifically, the image recovery device 318 first determines whether a specific pixel value in the decoded region frame data $RF_1$ is the replacement pixel $C_1$ using the replacement pixel index. This is achieved by comparing the specific pixel value to the replacement pixel value $C_1$ for the purpose of determining whether the specific pixel value indicates a color "near" the color indicated by the replacement pixel value $C_1$. If the specific pixel value is not "near" the replacement pixel $C_1$, then that pixel value is included in the recovered frame data. Subsequently, the first step is repeated for another pixel value in the region frame data $RF_1$. If the specific pixel value is "near" the replacement pixel value $C_1$, then the specific pixel value is detected as a replacement pixel value. Since the decoder of the present invention is able to key or select based on color, the decoder may be implemented and comprise a chroma keying apparatus and circuitry programed to key as described herein.

One embodiment of the present invention determines if a specific pixel value is "near" the replacement pixel value $C_1$ by measuring the distance the color indicated by the specific pixel value is from the color indicated by the replacement pixel value $C_1$. The specific pixel value is deemed near if the color indicated by the specific pixel value is within a predetermined distance, e.g., Euclidean distance, from the color indicated by the replacement pixel value $C_1$ in a predetermined color space. When a replacement pixel $C_1$ is detected, the image recovery device 318 proceeds to the second step where the decoded region frame data for a region frame $RF_n$ having previously segmented regions $R_{n-1}, \ldots, R_1$ is referenced to determine whether the corresponding pixel value is the replacement pixel $C_n$. The second step is repeated until the corresponding pixel value in the subsequent region decoded frame data is determined not to be the replacement pixel $C_n$, wherein such pixel value is included in the recovered frame data and the first step is repeated for another pixel value until the recovered frame data is entirely extracted. In other words, the region frame data $RF_n$ are referenced in ascending order according to the number of previously segmented regions in the region frame $R_n$. Specifically, the region frame data $RF_n$ with the least number of previously segmented region frames, i.e., $RF_1$, is referenced first. The next region frame data $RF_n$ referenced is region frame data $RF_2$, then region frame data $RF_3$, etc., until a non-replacement pixel value is detected.

Figure 12:
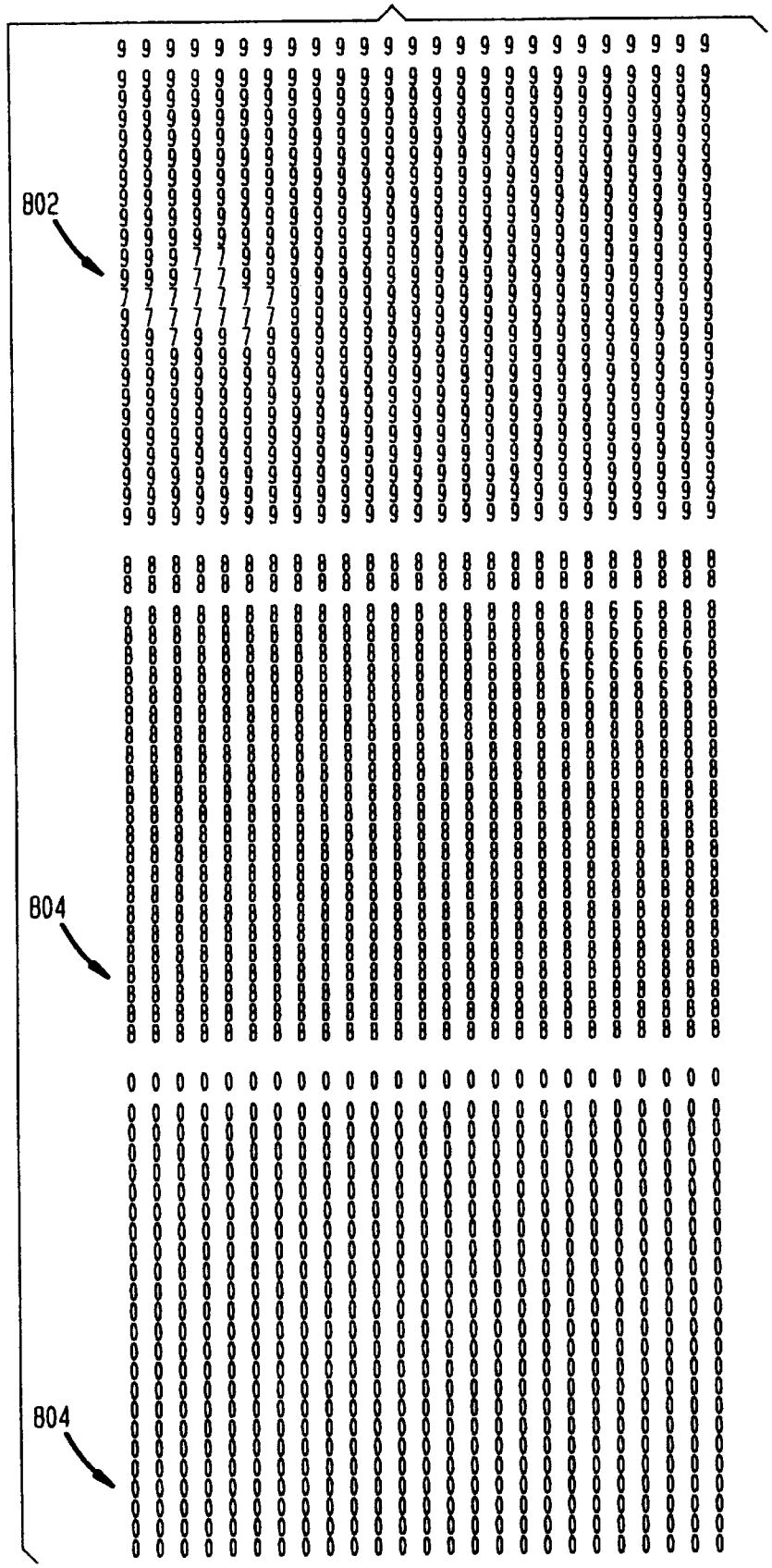
FIG. 12 illustrates decoded region frame data for the region frames depicted in FIG. 8.

Referring to FIG. 12, for example, there is illustrated the decoded region frame data for the region frames $RF_1$ 802, $RF_2$ 804 and $RF_3$ 806 depicted in FIG. 8. In one embodiment of the present invention, the image recovery device 318 references the topmost-leftmost pixel value in the decode region frame data $RF_1$ 802 and determines that it is the replacement pixel value $C_1$. The corresponding pixel value in the next decoded region frame data $RF_2$ 804 is subsequently referenced and determined to also be the replacement pixel value $C_2$. Likewise, the corresponding pixel value in the next decoded region frame data $RF_3$ 806 is referenced. In this instance, the pixel value is not the replacement pixel value $C_3$ and, thus is extracted to be included in the recovered frame data. Note that the replacement pixel values $P_{n,y}$ will never be referenced by the image recovery device 318 so long as the decoded region frame data $RF_n$ are referenced in ascending order according to the number of previously segmented regions $R_y$.

Figure 15:
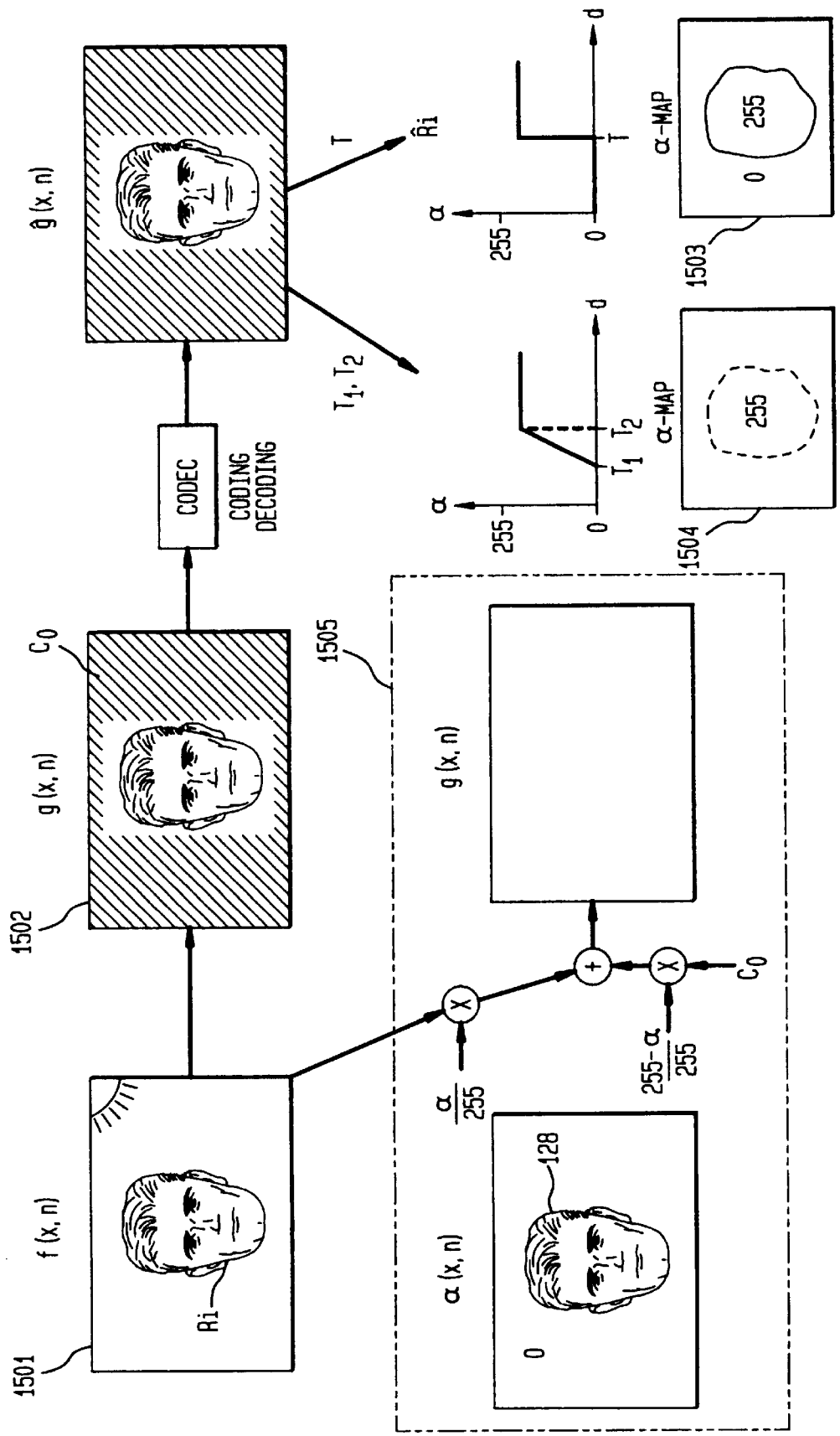
FIG. 15 illustrates a hard boundary condition between a subject region and its background and a softened boundary condition, and further begins to illustrate a process of using a weighting function for a transparent or semi-transparent object.

By way of further illustrating the principles of the present invention, FIG. 15 is provided as a summary of the above-described encoding/decoding technique and for introducing principles associated with handling boundaries between subject regions and non-subject regions and for encoding transparent or semi-transparent objects according to the present invention. Considering a video sequence including a happy face region $R_i$ of display block 1501, then the sequence may be represented as a function of x and n where x denotes the spatial coordinate $x=(x_0, x_1,)$ and n denotes the temporal index, for example, the frame number in the sequence. One region is shown but there may be K segmented regions $R_1(n), R_2(n), \ldots R_K(n)$ with happy face region $R_i$ shown where i is between 1 and K. The segmented regions can be overlapping regions or non-overlapping regions as in the region-based coding or overlapping layers. For ordinary video shot with a video camera, the regions are frequently non-overlapping. It is more typical that in computer graphics or in movies made with a blue-screen technique, the regions will be overlapping.

The coding process as already described involves encoding f(x,n) for the spatial coordinates in the region $R_i$ according to a function g(x,n). If $R_i$, where the happy face is, is referred to as the foreground, then the area that is not the happy face is the background. All the background pixels in the coding process for the background become a carefully chosen color $C_0$. This is shown as display block 1502 and represented mathematically by the encoding function g(x,n).

Now the problem for receiving g(x,n) on the other side of a coder/decoder ("codec") is to decode the encoded signal g(x,n) and determine the inverse or ĝ(x,n). What has been described thus far associated with the decoding process is a step function regeneration of the original coded image where there is a single threshold value T. The step function is shown immediately above alpha map 1503 and relates to a hard boundary condition. One simply compares the pixel values in the decoding function with the color value $C_0$. If a pixel has color that is close enough to $C_0$, say within a threshold T, it is detected as background and if on the other side of the step function, it is face or foreground. Taking the example that the pixel values above the threshold T represent the face and the values below the threshold represent the background, one obtains as a result of the decoding process a sharp boundary condition between $R_i$ and non-subject region, not $R_i$, or background.

For example, the background can be blue and the face pink. The alpha values above the threshold, say 128, are face and below the threshold are background. In the alpha map 1503, the background is below the threshold T and is 0 and the face is above the threshold T and shown as alpha equals 255. Threshold T is shown on the "d" or color distance scale.

Now instead of a step function or a binary segmentation map, the segmentation map can have gray-level values to create soft boundaries. In computer graphics or in making blue screen movies, alias-free, natural looking boundaries can be encoded by using two thresholds instead of one at the boundary regions. The color replacement operation and region recovery are softened by using, for example, a ramp function between the two thresholds. The ramp function is shown in the graph immediately above alpha map 1504 showing a softened boundary condition. Other functions for softening a boundary condition may come to mind as well while the ramp function is used for illustrative purposes.

Instead of using a single threshold T, two thresholds defined as $T_1$ and $T_2$, having a color distance d between them are used. A value of 0 may indicate background and a value of 255 foreground, assuming, for example, an octet (8 bits) of coding per pixel. The region between $T_1$ and $T_2$ is the boundary. The values of $T_1$ and $T_2$ determine the characteristic of the boundary.

Note that $T_1$ affects the amount of background while $T_2$ affects the amount of foreground. If $T_2$ is too high, part of the foreground will be cut out. If $T_1$ is too low, part of the background will be included into the contour region, and hence introduce artifacts toward the foreground. On the other hand, if $T_1$ and $T_2$ are too close to each other, then the boundary decision becomes "harder" and more akin to the step function of display 1503. The advantages of softening the boundary begin to disappear. The tradeoffs among these factors are considered and adjustments can be made to each threshold $T_1$ and $T_2$ to get the best segmentation maps and the adjustments can be image dependent. All information needed for such a decision on determining thresholds is at the encoder so a good decision is always possible and may be subjective or automated. For example, given enough computation power, the encoder can search for an optimal pair of thresholds $T_1$ and $T_2$. On the other hand, human interaction and more subjective determinations can be used in off-line applications. The thresholds can be transmitted from the encoder to the decoder.

Now continuing to refer to FIG. 15, there is introduced therein the concept of dealing with a transparent or semi-transparent object. Let us assume that the happy face is viewed through a glass window or semi-transparent screen. Then, the image of the happy face may be blurred or softened in its entirety. Referring to step 1505, there is described a method of encoding the happy face $R_i$ using a weighting function. Note that the weighting function comprises use of the alpha map divided by a scale factor such as 255 to obtain one input to a summer and 255—distance divided by the scale factor, say 255, times the coding color value $C_0$. First, it may be useful to signal the decoder from the encoder that a semi-transparent object is on the way. A chroma keying information flag, then, can be used to represent either transparent or semi-transparent pixels in the decoded picture.

When presented on the display, transparent pixels are not displayed; instead, a background picture which is externally controlled is revealed. Semi-transparent pixels are displayed by blending the pixel value in the current picture with the corresponding value in the background picture. For example, an octet (eight bits) is used to indicate the keying color value for each component used for chroma keying. For example, let α denote the transparency of a pixel where α being 255, the object is opaque and being 0, the pixel is perfectly transparent. Then, the resulting value for a pixel that is semi-transparent is somewhere between and is a weighted combination of the value in the current picture and the pixel value from the background picture that is specified externally. Thus, the resulting value for each component shall be $$[\alpha \cdot X + (255 - \alpha) \cdot Z]/255$$

where X is the decoded pixel component value and Z is the corresponding pixel component value from the background picture.

Another way of representing this weighting function more generally is to define the coding function as $$g(x, n) = \frac{\alpha(x, n)}{255} f(x, n) + \frac{255 - \alpha(x, n)}{255} C_o$$

where the alpha map sequence is α(x,n) and the semi-transparent object is represented as f(x,n).

At the encoder, the user specifies or selects the values of the thresholds based on the image and the encoder transmits the values to the decoder. The user also by selecting the threshold values specifies the alpha map which may be derived at the decoder from the threshold values. For example, in specifying the threshold values and referring briefly to FIG. 17, the value of the first threshold may be one tenth of the distance between the chroma key color and the object color while the second threshold may be nine tenths of the distance to the object color. The ratio of the thresholds to the object color distance is varied by the user depending on the application or the image and can be automatically selected.

For decoding, the α value is calculated by finding the distance of the pixel color from the key color value by the equation:

$$d = A_y(X_y - K_y)^2 + A_B(X_B - K_B)^2 + A_R(X_R - K_R)^2$$

where $X_y$, $X_B$ and $X_R$ are the Y, $C_B$ and $C_R$ values of the decoded pixel color, $K_y$, $K_B$ and $K_R$ are the corresponding key color parameters and $A_y$, $A_B$ and $A_R$ are keying flag bits which indicate which color components are used as keys. Pictorially the distance vectors can be graphically depicted in a color space.

Figure 16:
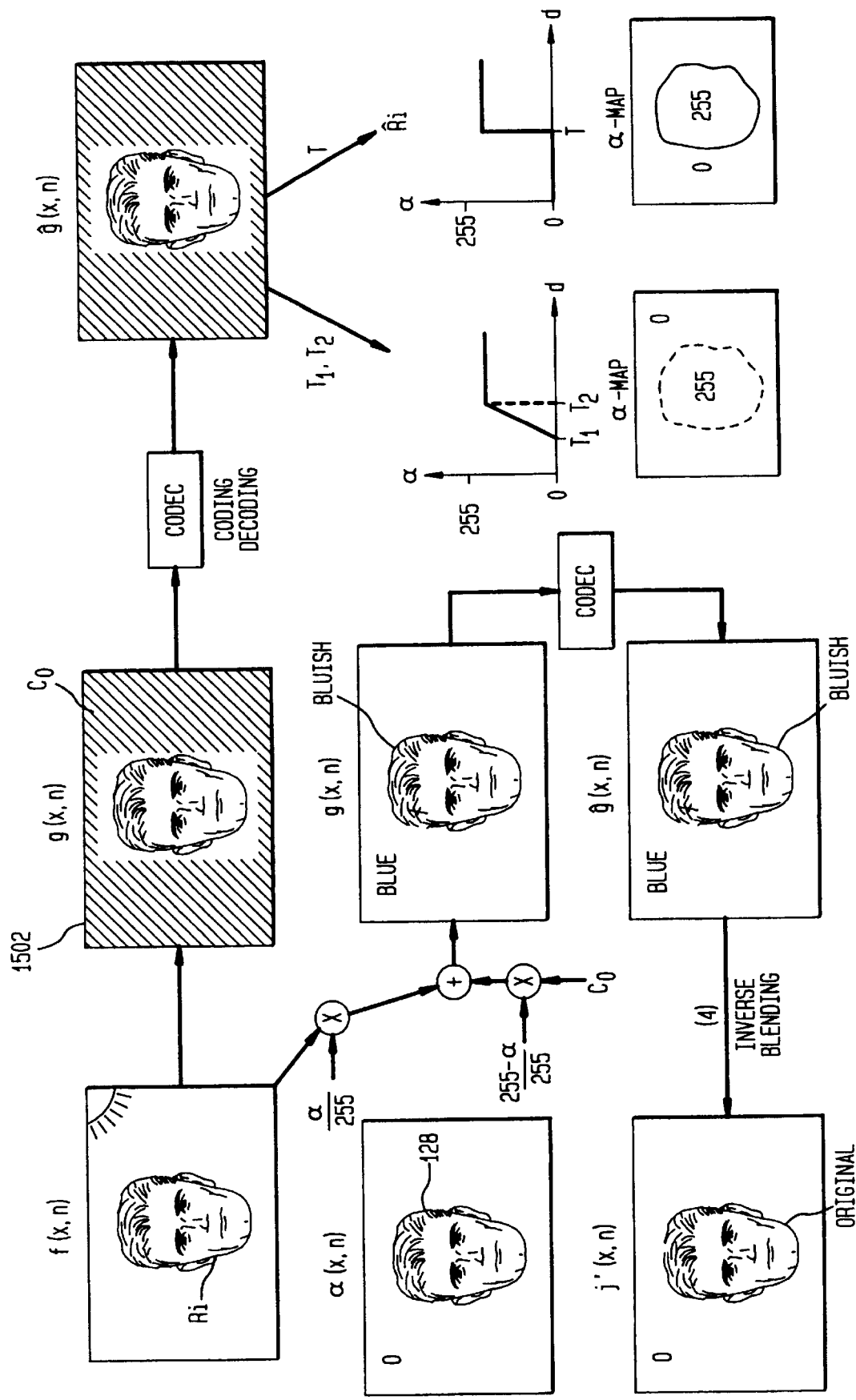
FIG. 16 illustrates a method of encoding a transparent or semi-transparent object, by employing a weighting function dependent on an encoded color and a semi-transparent image portion.

FIG. 16 takes FIG. 15 one step further. There is an inverse blending that occurs on the other side of the codec to restore the face image where the face image that is transmitted and received through the CODEC may be blended and appear bluish pink. Now, the process of inverse blending (4) will be described.

Figure 17:
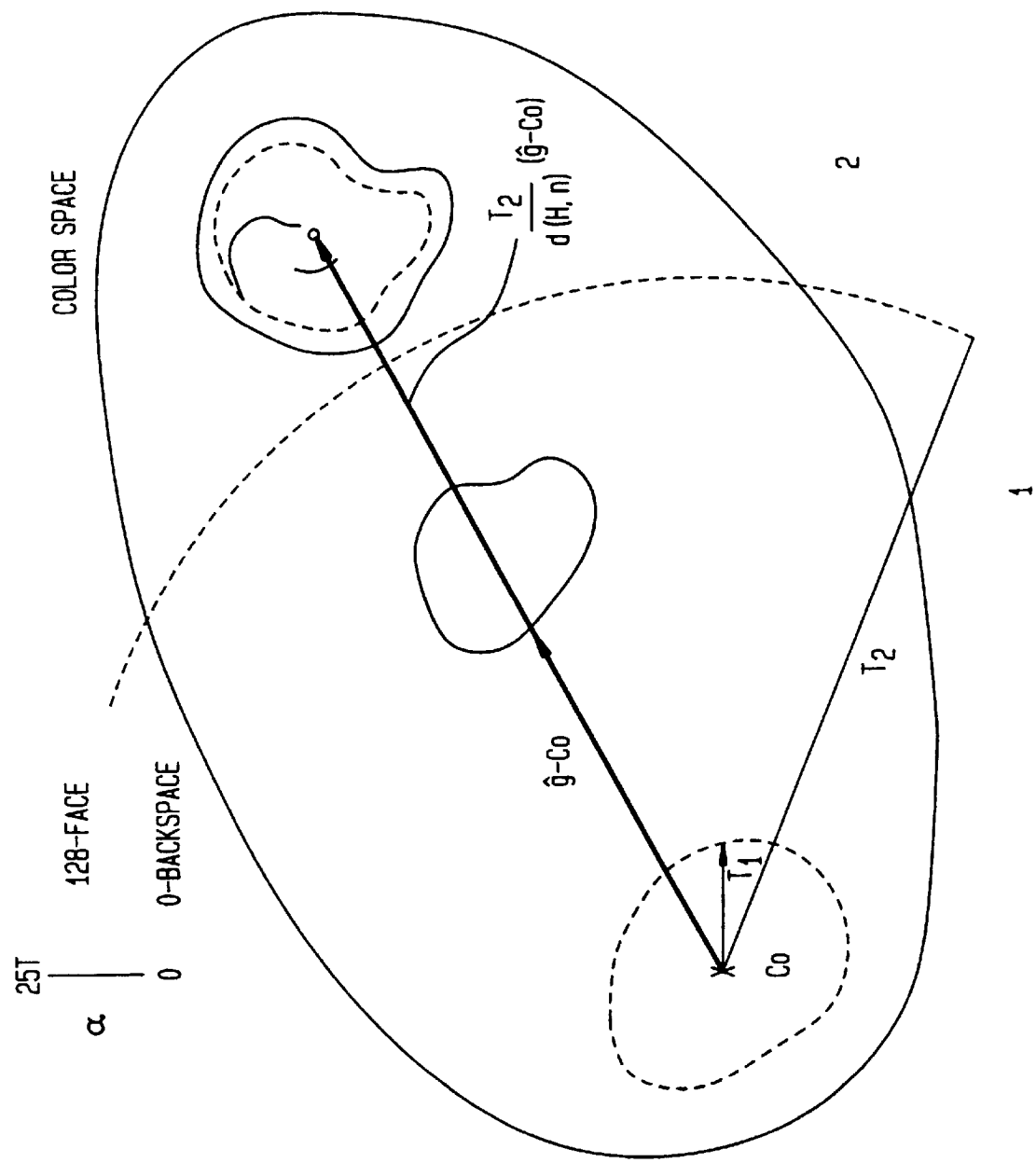
FIG. 17 illustrates a color space and a decoding function of the method of FIG. 16 wherein a color value of the semi-transparent image position is decoded via distances between a threshold and the encoded color as will be further described herein.

Referring to FIG. 17, there is shown a color space useful for explaining how to regenerate the original color at the decoder. The first threshold $T_1$ defines a small region around $C_0$ in the color space. The threshold $T_2$ represents a larger region in the direction of the desired color value shown in a cloud for all the colors of the happy face. The vector $\hat{g}$-$C_0$ points in the direction of the desired color and represents a 50% blending between the coding color and the object color. To recover the desired color, the $\hat{g}$-$C_0$ vector is modified or extended by the second threshold $T_2$ divided by the distance $d(\hat{g}(x,n), C_0)$ defined above.

Referring briefly to FIG. 16, the process may be explained as an inverse blending at a decoder (4) to reobtain the semi-transparent image of the happy face. Then the inverse blending process may be defined as follows:

$$g'(x, n) = \begin{cases} \hat{g}(x, n) & \text{if } d(\hat{g}(x, n), C_o) \geq T_2 \\ C_o + \dfrac{T_2}{d(\hat{g}(x, n), C_o)} (\hat{g}(x, n) - C_o) & \text{if } T_1 < d(\hat{g}(x, n), C_o) < T_2 \\ \text{arbitrary value} & \text{if } d(\hat{g}(x, n), C_o) \leq T_1 \end{cases}$$

Continuing the example where 255 represents opaque and 0 represent transparent, if d is less than $T_1$ then the alpha map value $\alpha$ is 0, and if d is greater than $T_2$, then $\alpha$ is 255. At upper left of FIG. 17 there is provided a linear graph of alpha where the range of alpha may be between 0 and 255 and a value of 128, approximately, may represent the face. But when d is between $T_1$ and $T_2$ then $\alpha=(d-T1)/(T2-T1)\cdot 255$.

Although the present invention has been described in considerable detail with reference to certain preferred embodiments, other embodiments are also applicable. All U.S. applications referenced herein should be deemed to be incorporated by reference as to their entire contents deemed essential to an understanding of the present invention. The spirit and scope of the appended claims should not be limited to the description of the preferred embodiments contained herein.

What I claim is:

1. A method for generating region frame data from video frame data, wherein said video frame data and region frame data include pixel values that define regions, said regions categorized as at least one subject region and at least one non-subject region, said method comprising:

extracting said pixel values defining a subject region of the at least one subject region from said video frame data into said region frame data;

assigning a non-subject pixel value in said region frame data for defining said at least one non-subject region, said non-subject pixel value indicative of a color not indicated by any of said pixel values defining said subject region; and assigning a first threshold value for pixels corresponding to the subject region and a second threshold value for pixels corresponding to the at least one non-subject region, wherein the first and second threshold values define a boundary region that is separate from the subject region and the at least one non-subject region.

2. A method as recited in claim 1 for softening boundary conditions between subject and non-subject regions further comprising the step of assigning a softening function for defining values between the first and second thresholds.

3. A method as recited in claim 2 wherein said softening function comprises a ramp function.

4. A method as recited in claim 1 for coding semi-transparent subject regions further comprising the step of applying a weighting function to the subject region values.

5. The method as recited in claim 4 wherein said weighting function is selectable in accordance with the first and second threshold values.

6. A method as recited in claim 1 for communicating the video frame data further comprising steps of:

transmitting the region frame data and the first and second thresholds to a decoder;

at the decoder, reconstructing the video frame data based on the region frame data and the first and second thresholds.

7. A method as recited in claim 1 for communicating the video frame data further comprising steps of:

converting the region frame data into encoded region frame data such that fewer bits are required to define said regions;

transmitting the encoded region frame data and the first and second thresholds to a decoder;

at the decoder, decoding the encoded region frame data into the region frame data; and at the decoder, reconstructing the video frame data based on the region frame data and the first and second thresholds.

8. An apparatus for processing video frame data into region frame data, wherein said video frame data and said region frame data include pixel values for defining regions, said regions include at least one subject region and at least one non-subject region, said apparatus comprising:

video coding means for segmenting said region frame data from said video frame data, said video coding means including;

means for extracting said pixel values from said video frame data defining a subject region of the at least one subject region;

means for assigning a non-subject pixel value for defining said at least one non-subject region, said non-subject pixel value indicative of a color not indicated by any said pixel values defining said subject region; and means for assigning a first threshold value for pixels corresponding to said subject region and a second threshold value for pixels corresponding to said at least one non-subject region, wherein the first and second threshold values define a boundary region that is separate from the subject region and the at least one non-subject region.

9. Apparatus as recited in claim 8 for softening boundary conditions between subject and non-subject regions further comprising means for assigning a softening function for defining values between the first and second thresholds.

10. Apparatus as recited in claim 9 for softening boundary conditions between subject and non-subject regions wherein said softening function comprises a ramp function.

11. Apparatus as recited in claim 8 for coding semi-transparent subject regions further comprising means for applying a weighting function to the subject region values.

12. Apparatus as recited in claim 11 for coding semi-transparent subject matter regions wherein said weighting function is selectable in accordance with the first and second threshold values.

13. Apparatus as recited in claim 8 for communicating the video frame data further comprising:

a transmitter for sending the region frame data and the first and second thresholds to a decoder.

14. Apparatus as recited in claim 13 for communicating the video frame data further comprising:

the decoder for reconstructing the video frame data based on the region frame data and the first and second thresholds.

15. Apparatus as recited in claim 14 for communicating the video frame data further comprising:

means for converting the region frame data into encoded region frame data such that fewer bits are required to define said regions, wherein the encoded frame data is sent to the decoder via the transmitter.

16. Apparatus as recited in claim 15 for communicating the video frame data further comprising:

means for decoding the encoded region frame data into the region frame data, wherein the decoder reconstructs the video frame data based on the region frame data and the first and second thresholds.

* * * * *